UNITED STATES PATENT OFFICE.

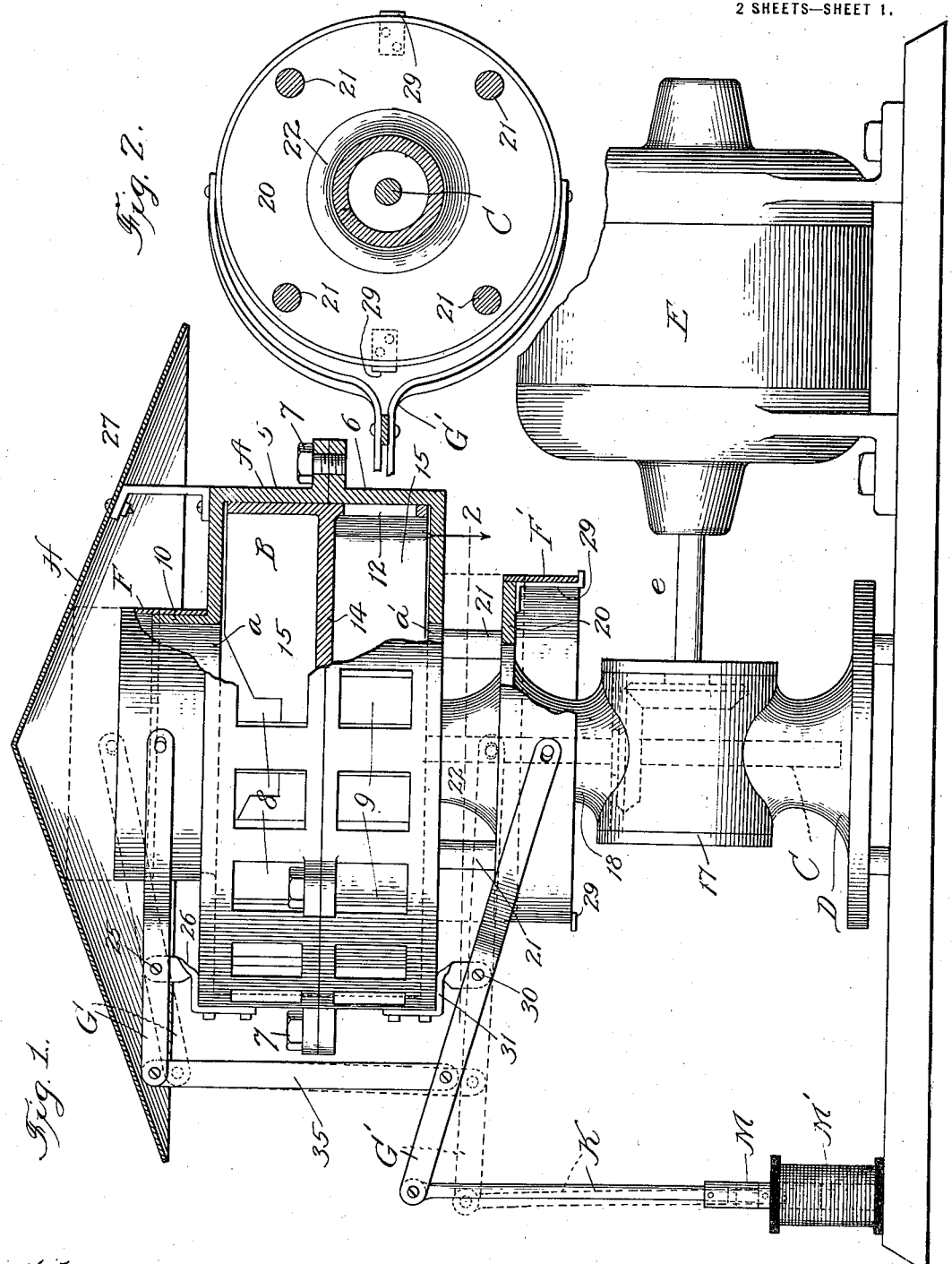

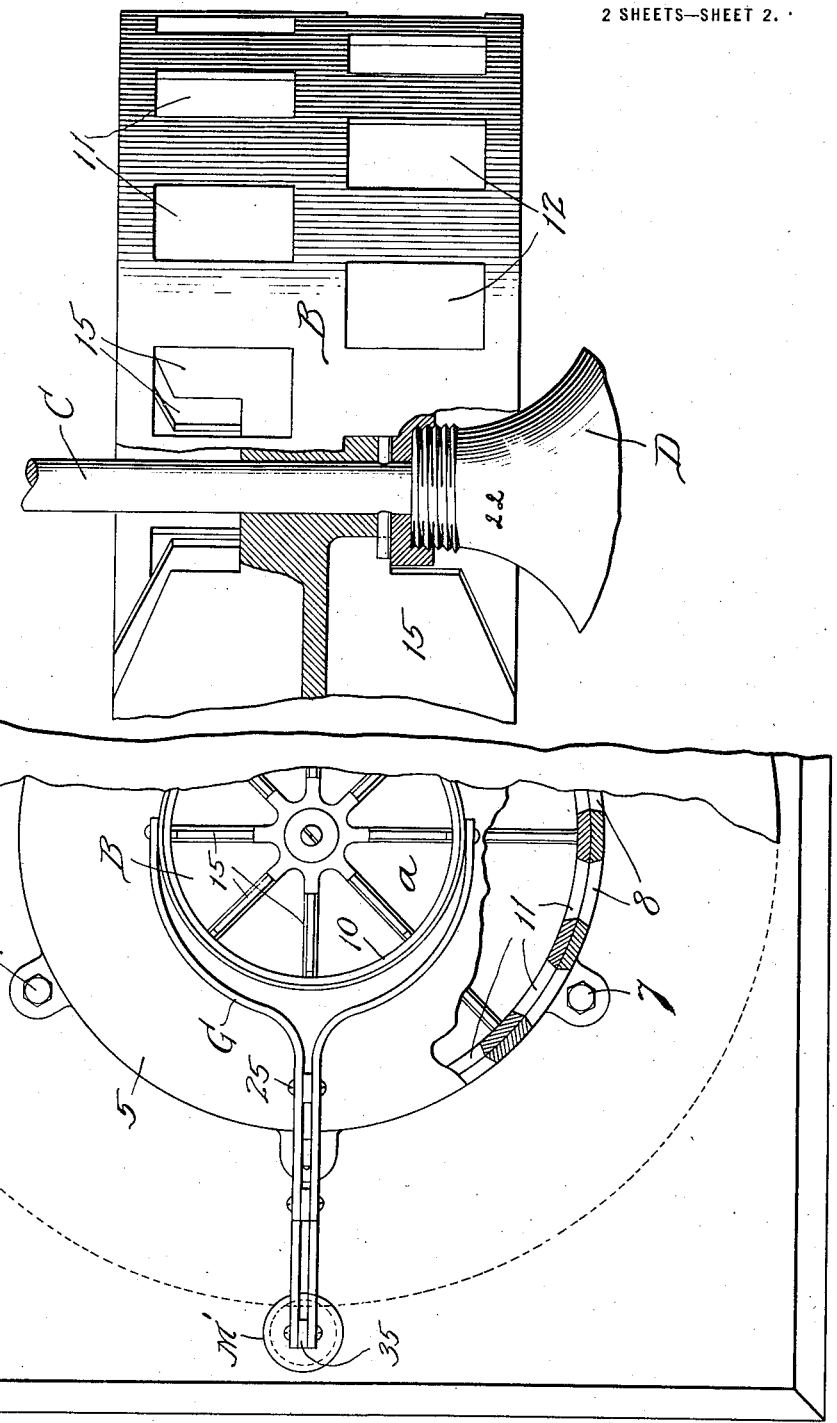

PHILIP J. SPIES, OF CHICAGO, ILLINOIS.

ALARM-SIGNAL.

1,279,603.  Specification of Letters Patent.  Patented Sept. 24, 1918.

Application filed January 7, 1916. Serial No. 70,745.

*To all whom it may concern:*

Be it known that I, PHILIP J. SPIES, a citizen of the United States, and a resident of Chicago, in the county of Cook and State of Illinois, have invented certain new and useful Improvements in Alarm-Signals, of which I do declare the following to be a full, clear, and exact description, reference being had to the accompanying drawings, forming a part of this specification.

My present invention has relation more particularly to that class of alarm signals commonly designated as "sirens," in which the air is propelled through a revolving cylinder or rotor working against a fixed cylinder, both having peripheral openings, so that the air driven radially through the openings escapes in intermittent jets or impulses which under the high speed of the revolving cylinder produces a loud and penetrating sound. This class of signals is now extensively used in cities, towns, villages, manufacturing plants, or like situations where it is desired to produce an audible signal of loud and penetrating character that can be heard for a long distance. My invention consists in the novel features of construction hereinafter described, illustrated in the accompanying drawings and pointed out in the claims at the end of this specification.

Figure 1 is a view partly in elevation and partly in section of a siren embodying my invention. Fig. 2 is a view in cross section on line 2—2 of Fig. 1. Fig. 3 is a plan view, parts being broken away and parts being shown in section.

Fig. 4 is an enlarged detail view partly in elevation and partly in section of a portion of the rotor and driving shaft.

The outer casing of my improved siren is formed of upper and lower members 5 and 6 having flanges bolted together as at 7. The periphery of the casing A is shown as formed with two rows of openings 8 and 9 for the outlet of air. The upper member 5 of the casing A is formed with a central air inlet opening $a$, while the lower member 6 of the casing is formed centrally with the air inlet opening $a'$. The inlet opening $a$ of the upper member 5 of the casing is provided with an outwardly projecting cylindrical flange 10, as shown in Fig. 1 of the drawings. The rotor B in the preferred form of my invention has its periphery formed with two rows of air outlet openings 11 and 12 corresponding with the openings 8 and 9 in the periphery of the casing A and a partition 14 extends across the rotor between the upper and lower rows of openings 11 and 12. On opposite sides of the partition 14 are arranged the blades 15 that radiate from the center of the rotor to its periphery, as clearly seen in Fig. 3 of the drawings. The rotor B is centrally perforated and is mounted upon and fixed to a vertically disposed shaft C, shown by dotted lines in Fig. 1, as stepped in a suitable frame D. The frame D is preferably a casting having a gear box 17 at a distance above its base, in which gear box will be arranged a gearing (shown by dotted lines in Fig. 1) whereby the rotor will be driven. Any suitable means may be employed for driving the rotor but I prefer to use for this purpose an electric motor E, the shaft $e$ of which will be geared to the shaft C whereon the rotor B is mounted. Above the gear box 17 rises the extension 18 of the casting D, integral with which is formed a plate or table 20 and from this table rise suitable posts 21 that support the casing A. Above the table 20 also rises a central portion 22 through which passes the shaft C. The ends of the blades 15 adjacent the center of the rotor are cut away as shown in Fig. 4 but the wide portions of these blades extend to approximately the top and bottom walls of the members 5 and 6 of the casing.

By forming the casing A of upper and lower sections bolted together, these parts may be conveniently made each of a single casting and the rotor B is also preferably cast in one piece. The blades on opposite sides of the partition 14 of the rotor form separate fans or blowers, the air inlet $a$ opening to the upper fan or blower and the air inlet $a'$ admitting air to the lower fan or blower.

When the rotor B is revolved at a high rate of speed, air admitted to the upper and lower blowers through the openings $a$ and $a'$ is forced outwardly through the peripheral openings in the rotor B and casing A and the air impulses produce an audible signal of loud and penetrating character.

In order to enable the siren to give forth signals of different character so as to indicate, for example, the location of a fire (when the siren is used for fire alarm purposes), I provide the improved mechanism next to be described: Upon the cylindrical flange 10 that surrounds the air inlet opening $a$ in the upper portion of the casing A is mounted a cylindrical valve F and this valve F is moved axially upon the flange 10, preferably by means of a forked operating lever G that is pivoted, as at 25, upon a bracket 26 fixed to the top of the casing A (see Fig. 1). At a distance above the casing A and supported upon suitable brackets 27 is mounted a hood H that serves not only to protect the siren but also to deflect downwardly the sounds issuing therefrom. When the cylindrical valve F is raised from the position shown by full lines in Fig. 1 to the position shown by dotted lines, the cylindrical valve F serves to check or cut off the passage of air to the inlet opening $a$ and this muffles the sound issuing from the peripheral openings in the upper portion of the casing A. Beneath the inlet opening $a'$ whereby the air is admitted to the lower fan or blower of the rotor B, is arranged a cylindrical valve F' that surrounds the plate or table 20 and is guided by depending arms 29 bolted to and depending from the plate or table 20 at its periphery, as clearly shown in Fig. 1 of the drawings. This cylindrical valve F' has connected thereto a forked operating lever G' that is pivoted as at 30 to a bracket 31 fixed to the lower part of the casing A. In order to insure the unison movement of the cylindrical valves F and F', their operating levers G and G' are connected together by means of a link 35. To the outer end of the operating lever G' is attached suitable means whereby the levers G and G' may be actuated in order to shift the valves F and F' from closed to open position and vice versa. Preferably, this means consists of a rod K, the upper end of which is connected to the lever G' and the lower end of which is connected to the core M of a solenoid magnet M'.

From the foregoing description it will be seen that when it is desired to operate my improved siren, it is only necessary to send electric current through the motor E in order to impart a high speed of revolution to the rotor B. If it is desired to transmit variable signals, electric current will be passed through the solenoid magnet M', thereby causing the core M of this magnet to be drawn downward and thus through the operating levers G and G', shift the cylindrical valves F and F' from the open position shown in full lines to the closed position indicated by the dotted lines in Fig. 1 of the drawings. When the valves F and F' are shifted to closed position, they will check or muffle the sound issuing from the siren and by this means any desired signal can be transmitted. As far as I am aware, my invention shows the first instance of a siren in which the muffling of the sound is effected by valve mechanism that controls the admission of air to the rotor of the siren, and obviously, within the limits of my invention, the precise construction of valve mechanism may be varied without departing from the spirit of the invention.

Having thus described my invention, what I claim as new and desire to secure by Letters Patent is—

1. A signal of the character described comprising a cylindrical casing having an air inlet opening at each end and air outlet openings at its periphery, a rotor revolubly mounted within said casing and having a fan arranged opposite each of said inlet openings, a shaft for imparting revolution to said rotor and annular valves at the top and bottom of said casing for regulating the admission of air to the opposite ends of the casing.

2. A signal of the character described comprising a cylindrical casing having an air inlet opening at each end and air outlet openings at its periphery, a rotor revolubly mounted within said casing and having a fan arranged opposite each of said inlet openings, a shaft for imparting revolution to said rotor, valves for regulating the admission of air to the opposite ends of the casing and connections between said valves whereby they may be conjointly operated.

3. A signal of the character described comprising a cylindrical casing having at its end an air inlet opening provided with a circular flange and having air outlet openings in its periphery, a rotor revolubly mounted in said casing, an axially movable, cylindrical valve extending around said inlet opening for checking the passage of air through said opening, said cylindrical valve being open at both ends, and means for actuating said valve.

PHILIP J. SPIES.